United States Patent
Kang et al.

(10) Patent No.: US 9,188,809 B2
(45) Date of Patent: Nov. 17, 2015

(54) LIQUID CRYSTAL DISPLAY AND METHOD OF OPTICAL COMPENSATION THEREOF

(71) Applicant: SHENZHEN CHINA STAR OPTOELECTRONICS TECHNOLOGY CO., LTD, Shenzhen (CN)

(72) Inventors: Chihtsung Kang, Shenzhen (CN); Bo Hai, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 14/004,419

(22) PCT Filed: Jul. 11, 2013

(86) PCT No.: PCT/CN2013/079240
§ 371 (c)(1),
(2) Date: Sep. 11, 2013

(87) PCT Pub. No.: WO2015/003371
PCT Pub. Date: Jan. 15, 2015

(65) Prior Publication Data
US 2015/0248032 A1    Sep. 3, 2015

(30) Foreign Application Priority Data

Jul. 10, 2013    (CN) .......................... 2013 1 0288042

(51) Int. Cl.
*G02F 1/1335*    (2006.01)
*G02F 1/1337*    (2006.01)
*G02F 1/13363*    (2006.01)

(52) U.S. Cl.
CPC ...... *G02F 1/13363* (2013.01); *G02F 1/133528* (2013.01); *G02F 2001/133631* (2013.01); *G02F 2413/02* (2013.01); *G02F 2413/13* (2013.01); *G02F 2413/14* (2013.01)

(58) Field of Classification Search
CPC .......... G02F 1/13363; G02F 1/133634; G02F 2202/40; G02F 1/1393; G02F 1/133707; G02F 2001/133742; G02B 5/3083; G02B 5/3016
USPC ........................................ 349/117, 118, 130
See application file for complete search history.

(56) References Cited

U.S. PATENT DOCUMENTS

2008/0088780 A1*    4/2008    Nakatsugawa ................ 349/118

* cited by examiner

*Primary Examiner* — Mike Qi
(74) *Attorney, Agent, or Firm* — Mark M. Friedman

(57) ABSTRACT

The present invention discloses a liquid crystal display and a method of optical compensation thereof. Specifically, the present invention adjusts compensation values of a uniaxial positive birefringence A-Plate and a uniaxial negative birefringence C-Plate, especially a value range of retardation in a thickness direction $R_{th}$ of the uniaxial negative birefringence C-Plate is controlled. By adjusting the compensation values of the above-mentioned two types of compensation films, the dark-state light leakage phenomenon is suppressed. The present invention is capable of suppressing the dark-state light leakage phenomenon at a large viewing angle effectively and increasing the contrast and clarity at a large viewing angle.

15 Claims, 8 Drawing Sheets

Isoluminance Contour

Equal Contrast Ratio Contour

Isoluminance Contour

Equal Contrast Ratio Contour

Isoluminance Contour

Equal Contrast Ratio Contour

LIQUID CRYSTAL DISPLAY AND METHOD OF OPTICAL COMPENSATION THEREOF

BACKGROUND OF THE INVENTION

1. Field of the Invention

The present invention relates to a liquid crystal display technology, more particularly, to a liquid crystal display and a method of optical compensation thereof.

2. Description of the Related Art

With the growing popularity of liquid crystal display panels, the display quality requirements for liquid crystal display panels have become increasingly demanding. Take the thin film transistor liquid crystal display (TFT-LCD) as an example. As the observation angle of the TFT-LCD increases, the contrast of screen gradually decreases and the screen clarity also gradually decreases. This is because the birefringence of the liquid crystal molecules in the liquid crystal layer changes as the observation angle changes. As a result, a wide viewing angle compensation film is utilized to perform compensation so that dark-state light leakage is effectively reduced to greatly improve the contrast of the screen within a certain range of viewing angle.

The general compensation principle of the compensation film is to correct phase differences generated by liquid crystal at different viewing angle. Hence, the birefringence of the liquid crystal molecules is symmetrically compensated.

For different display modes for the liquid crystal display, the compensation films adopted are different. In a large-size LCD TV, the compensation film utilized is mostly for the vertical alignment (VA) display mode. During an early stage, N-TAC produced by Konica Corporation is adopted. Later, with the continuous development, products including Zeonor from Opotes Corporation, F-TAC series from Fujitsu, X-Plate from Nitto Denko, etc, are adopted.

For the same optical path difference of liquid crystal, the dark-state light leakage at a large viewing angle will differ and the contrast will also differ if the compensation value of the compensation film is different. Please refer to FIG. 1 and FIG. 2. FIG. 1 is schematic diagram of an isoluminance contour after dark-state light leakage is compensated by utilizing a uniaxial positive birefringence A-Plate and a uniaxial negative birefringence C-Plate according to the prior art. FIG. 2 is a schematic diagram of an equal contrast ratio contour at any viewing angle after being compensated by utilizing the A-Plate and the C-Plate according to the prior art. Compensation values for the above-mentioned A-Plate and the C-Plate are shown in the following table:

| Optical path difference of liquid crystal | Pretilt angle of liquid crystal | A-Plate Ro | A-Plate Rth | C-Plate Rth |
|---|---|---|---|---|
| 333.5 nm | 89° | 109 nm | 55 nm | 403 nm |

As shown in FIG. 1 and FIG. 2, it is not difficult to understand that, when the prior art A-Plate and C-Plate are adopted, their compensation values result in a severe dark-state light leakage phenomenon at a large viewing angle. The contrast at a large viewing angle becomes poor, and the range of viewing angle is small.

It is therefore very important to resolve the above-mentioned technical problems.

SUMMARY OF THE INVENTION

The present invention provides a liquid crystal display and a method of optical compensation thereof to resolve the technology problems of severe dark-state light leakage phenomenon at a large viewing angle caused by adopting an A-plate and a C-plate having compensation values according to the prior art, poor contrast at a large viewing angle, and small viewing angle range.

The present invention provides a liquid crystal display having a wavelength of 550 nm. A range of an optical path difference of liquid crystal LCΔND of the liquid crystal display at the wavelength of 550 nm is 324.3 nm≤LCΔND≤342.8 nm. The liquid crystal display comprises:
a first substrate;
a second substrate;
a liquid crystal layer disposed between the first substrate and the second substrate;
a first polarizer film disposed on an outer side of the first substrate;
a second polarizer film disposed on an outer side of the second substrate;
a uniaxial positive birefringence A-Plate; and
a uniaxial negative birefringence C-Plate, the uniaxial positive birefringence A-Plate and the uniaxial negative birefringence C-Plate being disposed between the first substrate and the first polarizer film or between the second substrate and the second polarizer film;
wherein a value range of in-plane retardation $R_o$ of the uniaxial positive birefringence A-Plate is taken as 92 nm≤$R_o$≤184 nm, a value range of retardation in a thickness direction $R_{th}$ of the uniaxial positive birefringence A-Plate is taken as 46 nm≤$R_{th}$≤92 nm, a value range of retardation in a thickness direction $R_{th}$ of the uniaxial negative birefringence C-Plate is taken as Y1≤$R_{th}$≤Y2, and Y1 and Y2 satisfy the following equations:

$$Y1=0.0000826x^4-0.022868x^3+2.4074x^2-114.326x+2251.5;$$

$$Y2=-0.00006472x^4+0.017705x^3-1.8284x^2+84.4843x-1181.17;$$

X is a value of the retardation in the thickness direction $R_{th}$ of the uniaxial positive birefringence A-Plate.

The present invention also provides a liquid crystal display comprising:
a first substrate;
a second substrate;
a liquid crystal layer disposed between the first substrate and the second substrate;
a first polarizer film disposed on an outer side of the first substrate;
a second polarizer film disposed on an outer side of the second substrate;
a uniaxial positive birefringence A-Plate; and
a uniaxial negative birefringence C-Plate, the uniaxial positive birefringence A-Plate and the uniaxial negative birefringence C-Plate being disposed between the first substrate and the first polarizer film or between the second substrate and the second polarizer film;
wherein a value range of in-plane retardation $R_o$ of the uniaxial positive birefringence A-Plate is taken as 92 nm≤$R_o$≤184 nm, a value range of retardation in a thickness direction $R_{th}$ of the uniaxial positive birefringence A-Plate is taken as 46 nm≤$R_{th}$≤92 nm, a value range of retardation in a thickness direction $R_{th}$ of the uniaxial negative birefringence C-Plate is taken as Y1≤$R_{th}$≤Y2, and Y1 and Y2 satisfy the following equations:

$$Y1=0.0000826x^4-0.022868x^3+2.4074x^2-114.326x+2251.5;$$

$$Y2=-0.00006472x^4+0.017705x^3-1.8284x^2+84.4843x-1181.17;$$

X is a value of the retardation in the thickness direction $R_{th}$ of the uniaxial positive birefringence A-Plate.

The present invention further provides a method of optical compensation for a liquid crystal display. The method comprises:

adjusting a value range of in-plane retardation $R_o$ of a uniaxial positive birefringence A-Plate to 92 nm≤$R_o$≤184 nm;

adjusting a value range of retardation in a thickness direction $R_{th}$ of the uniaxial positive birefringence A-Plate to 46 nm≤$R_{th}$≤92 nm;

adjust a value range of retardation in a thickness direction $R_{th}$ of a uniaxial negative birefringence C-Plate to Y1≤$R_{th}$≤Y2;

wherein Y1 and Y2 satisfy the following equations:

$$Y1=0.0000826x^4-0.022868x^3+2.4074x^2-114.326x+2251.5;$$

$$Y2=-0.00006472x^4+0.017705x^3-1.8284x^2+84.4843x-1181.17;$$

X is a value of the retardation in the thickness direction $R_{th}$ of the uniaxial positive birefringence A-Plate, the uniaxial positive birefringence A-Plate and the uniaxial negative birefringence C-Plate are disposed between a first substrate and a first polarizer film of the liquid crystal display or between a second substrate and a second polarizer film of the liquid crystal display.

In contrast to the prior art, the present invention adjusts the compensation values of the uniaxial positive birefringence A-Plate and the uniaxial negative birefringence C-Plate in the liquid crystal display to suppress the dark-state light leakage phenomenon at a large viewing angle. The present invention is capable of increasing the contrast and clarity at a large viewing angle (not the azimuth angle from the horizontal or vertical direction) effectively.

These and other features, aspects and advantages of the present disclosure will become understood with reference to the following description, appended claims and accompanying figures.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 3:
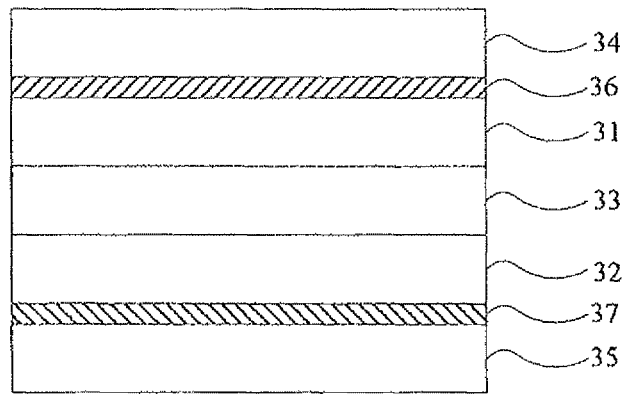
FIG. 3 is a schematic diagram showing a structure of a liquid crystal display according to a first preferred embodiment of the present invention.

Please refer to FIG. 3, FIG. 3 is a schematic diagram showing a structure of a liquid crystal display according to a first preferred embodiment of the present invention.

According to the embodiment of the present invention, the liquid crystal display is preferably a vertical alignment liquid crystal display. In the visible wavelength range (380 nm, 760 nm), preferably, 550 nm, a range of an optical path difference of liquid crystal LCΔND of the liquid crystal display at a wavelength of 550 nm is 324.3 nm≤LCΔND≤342.8 nm, namely the range [324.3 nm, 324.8 nm]. A range of a pretilt angle of liquid crystal is 85°≤Pretilt angle<90°, namely the range [85°, 90°).

According to the first embodiment shown in FIG. 3, the liquid crystal display comprises a first substrate 31, a second substrate 32, a liquid crystal layer 33, a first polarizer film 34, and a second polarizer film 35. The liquid crystal display further comprises a uniaxial positive birefringence A-Plate 36 and a uniaxial negative birefringence C-Plate 37. The liquid crystal layer 33 is disposed between the first substrate 31 and the second substrate 32. The first polarizer film 34 is disposed on an outer side of the first substrate 31. The second polarizer film 35 is disposed on an outer side of the second substrate 32.

Specifically, the uniaxial positive birefringence A-Plate 36 and the uniaxial negative birefringence C-Plate 37 may be disposed on two opposite sides of the liquid crystal layer 33, and are disposed between the first substrate 31 and the first polarizer film 34 or between the second substrate 32 and the second polarizer film 35.

For example, according to the first preferred embodiment shown in FIG. 3, the uniaxial positive birefringence A-Plate 36 is disposed between the first substrate 31 and the first polarizer film 34. The uniaxial negative birefringence C-Plate 37 is disposed between the second substrate 32 and the second polarizer film 35.

Figure 4:
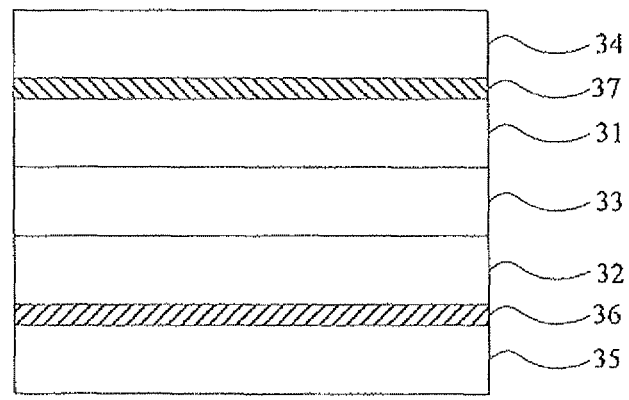
FIG. 4 is a schematic diagram showing a structure of a liquid crystal display according to a second preferred embodiment of the present invention.

According to a second preferred embodiment shown in FIG. 4, the uniaxial positive birefringence A-Plate 36 is disposed between the second substrate 32 and the second polarizer film 35. The uniaxial negative birefringence C-Plate 37 is disposed between the first substrate 31 and the first polarizer film 34.

In other embodiments, the uniaxial positive birefringence A-Plate 36 and the uniaxial negative birefringence C-Plate 37 may be disposed on the same side of the liquid crystal layer 33, and are disposed between the first substrate 31 and the first polarizer film 34 or between the second substrate 32 and the second polarizer film 35.

Figure 5:
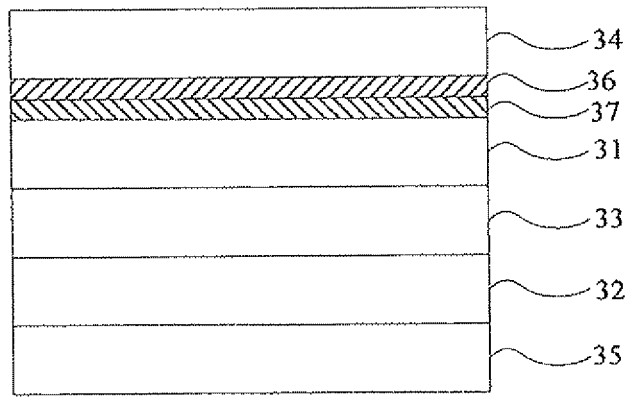
FIG. 5 is a schematic diagram showing a structure of a liquid crystal display according to a third preferred embodiment of the present invention.

For example, according to a third preferred embodiment shown in FIG. 5, the uniaxial positive birefringence A-Plate 36 is attached to the uniaxial negative birefringence C-Plate 37 and are disposed between the first substrate 31 and the first polarizer film 34.

Figure 6:
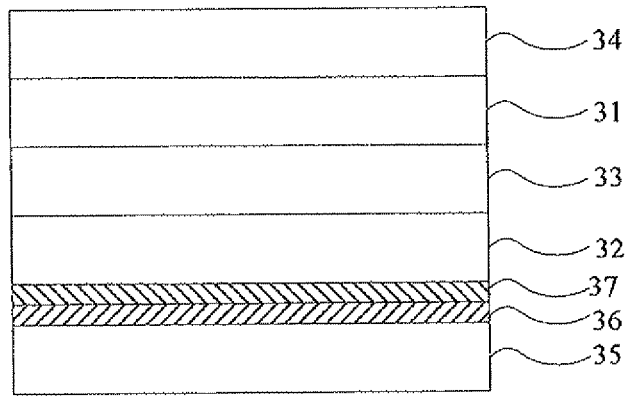
FIG. 6 is a schematic diagram showing a structure of a liquid crystal display according to a fourth preferred embodiment of the present invention.

According to a fourth preferred embodiment shown in FIG. 6, the uniaxial positive birefringence A-Plate 36 is attached to the uniaxial negative birefringence C-Plate 37 and are disposed between the second substrate 32 and the second polarizer film 35.

According to the above-mentioned preferred embodiments of liquid crystal displays, the absorption axis of the first polarizer film 34 is 0°. The absorption axis of the second polarizer film 35 is 90°. In other embodiments, the absorption axis of the first polarizer film 34 is 90°. The absorption axis of the second polarizer film 35 is 0°. As long as each of the slow axis of the uniaxial positive birefringence A-Plate 36 and the slow axis of the uniaxial negative birefringence C-Plate 37 is respectively perpendicular to the absorption axis of the polarizer film (the first polarizer film 34 or the second polarizer film 35) on the same side of the liquid crystal layer 33, it is applicable to the present invention.

The present invention simulates the dark-state light leakage by disposing the uniaxial positive birefringence A-Plate 36 and the uniaxial negative birefringence C-Plate 37 having different compensation values. The ranges of compensation values corresponding to the dark-state light leakage are thus obtained based on simulation results.

In order to obtain the optimized compensation effects, during the simulation process, the angle between each of the slow axis of the uniaxial positive birefringence A-Plate 36 and the slow axis of the uniaxial negative birefringence C-Plate 37 and the absorption axis of their corresponding polarizer film is first set to 90°. The pretilt angle of liquid crystal of the liquid crystal display is set within the range [85°, 90°). The azimuth angle of liquid crystal in four quadrants is set to 45° pretwist. The optical path difference of liquid crystal LCΔND is set within the range [324.3 nm, 342.8 nm]. The light source utilized during simulation is a blue light-YAG (Yttrium Aluminum Garnet) LED spectrum. The center luminance is defined as 100 nit, and the light source is in a Lambert distribution.

Figure 7:
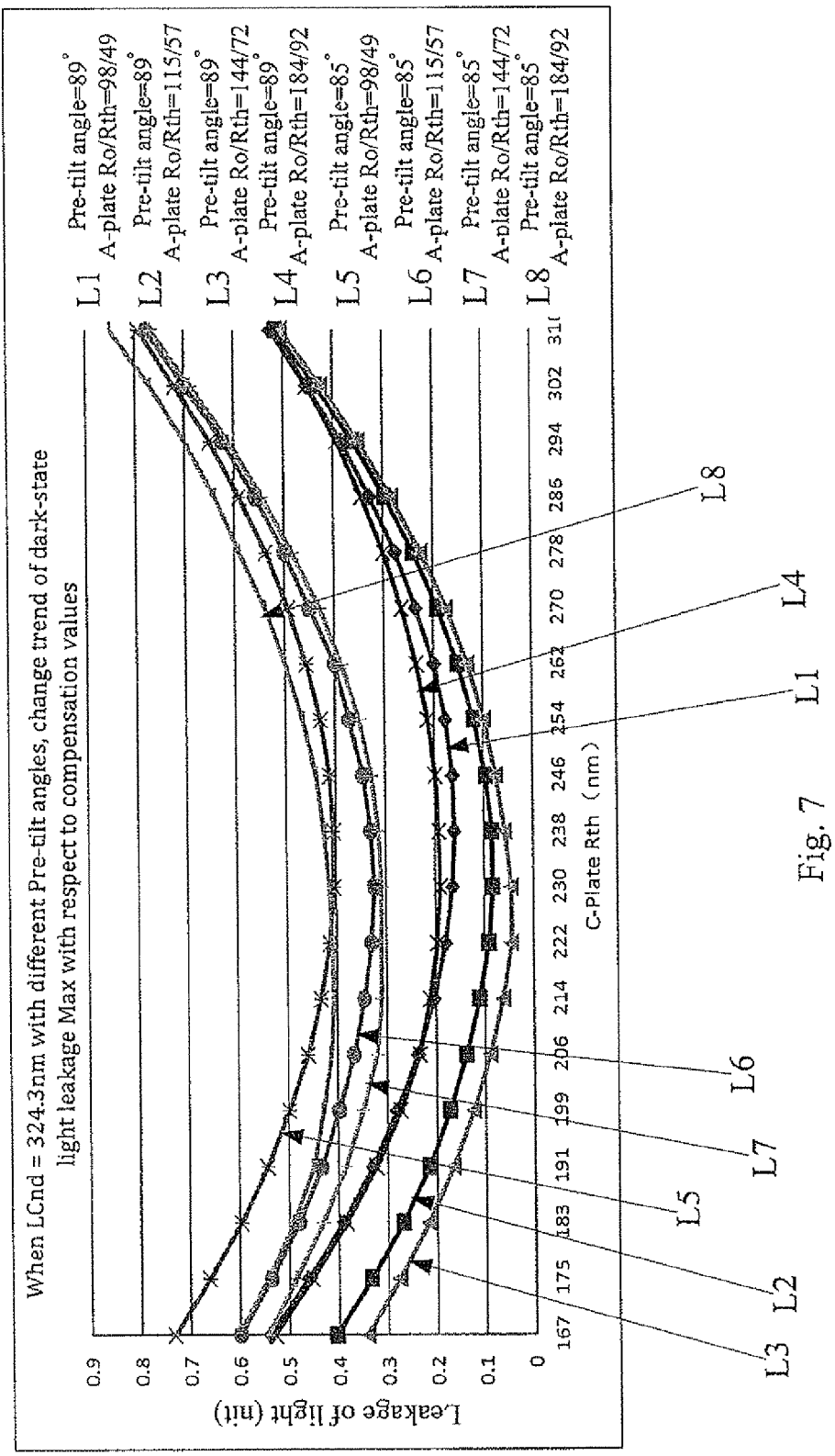
FIG. 7 is a change curve of light leakage with respect to retardation values of the liquid crystal display during simulation process.
Figure 8:
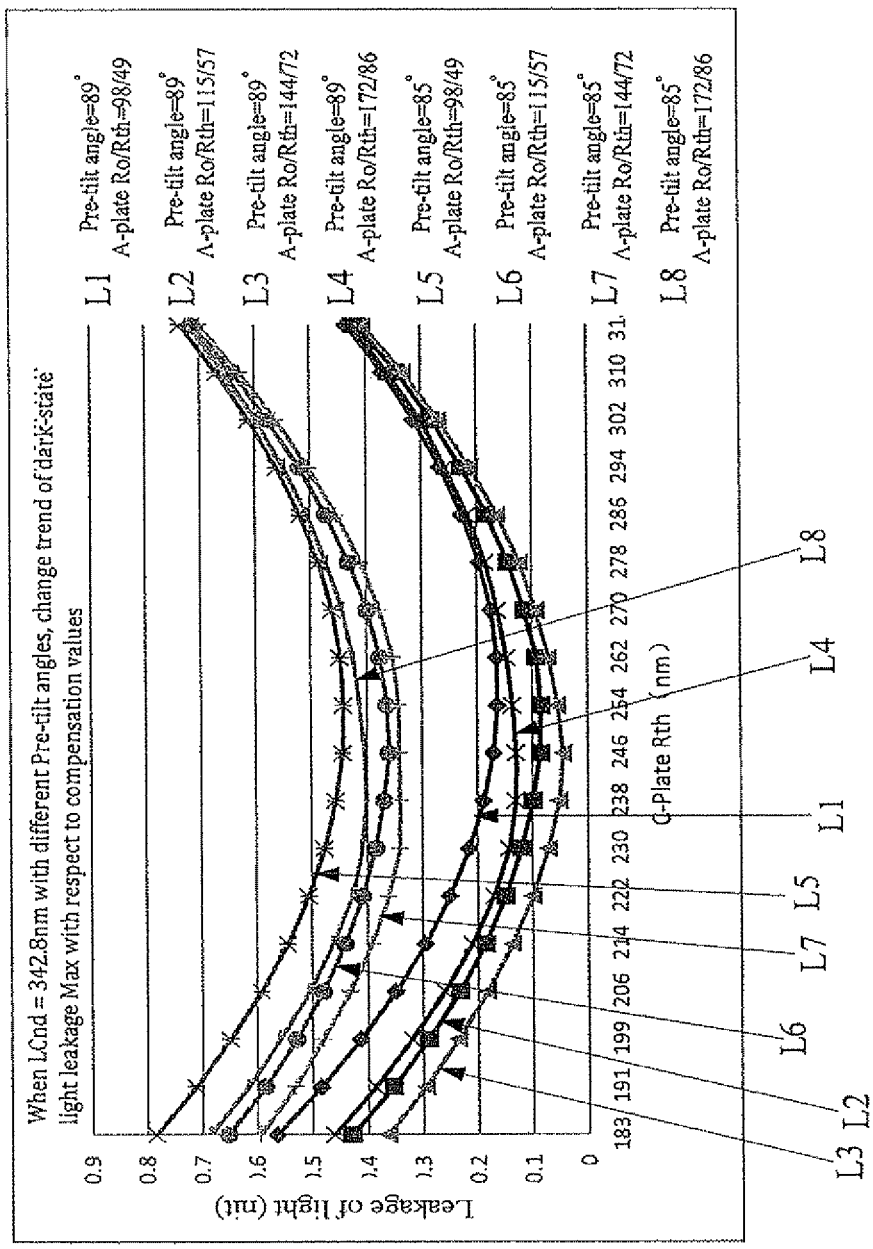
FIG. 8 is a change curve of light leakage with respect to retardation values of the liquid crystal display during simulation process.

Please refer to FIG. 7 and FIG. 8, which are schematic diagrams showing change curves of light leakage with respect to retardation values, for the simulation results. FIG. 7 is a schematic diagram showing a change curve of light leakage when in-plane retardation $R_o$ and retardation in a thickness direction $R_{th}$ of the uniaxial positive birefringence A-Plate 36 and retardation in a thickness direction $R_{th}$ of the uniaxial negative birefringence C-Plate 37 are taken as different values with the optical path difference of liquid crystal LCΔND being 342.3 nm and the pretilt angle being 89° and 85°. FIG. 8 is a schematic diagram showing a change curve of light leakage when the in-plane retardation $R_o$ and the retardation in the thickness direction $R_{th}$ of the uniaxial positive birefringence A-Plate 36 and the retardation in the thickness direction $R_{th}$ of the uniaxial negative birefringence C-Plate 37 are taken as different values with the optical path difference of liquid crystal LCΔND being 342.8 nm and the pretilt angle being 89° and 85°. In FIG. 7 and FIG. 8, A-Plate $R_o$ represents the in-plane retardation $R_o$ of the uniaxial positive birefringence A-Plate 36. A-Plate $R_{th}$ represents the retardation in the thickness direction $R_{th}$ of the uniaxial positive birefringence A-Plate 36. C-Plate $R_{th}$ represents the retardation in the thickness direction $R_{th}$ of the uniaxial negative birefringence C-Plate 37.

Based on the above-mentioned simulation, it is derived that at different pretilt angles, the effect of the compensation values of the uniaxial positive birefringence A-Plate 36 to the dark-state light leakage and the effect of the compensation value of the uniaxial negative birefringence C-Plate 37 to the dark-state light leakage follow the same trend. Namely, at different pretilt angles, the minimum dark-state light leakage corresponds to the same range of compensation value. According to the simulation results, when the optical path difference of liquid crystal LCΔND is within [324.3 nm, 342.8 nm] and the pretilt angle is within (85°, 90°) and the dark-state light leakage is less than 0.2 nit (the simulated dark-state light leakage when the pretilt angle is 89°, not the actual value), corresponding ranges of retardation values of both the uniaxial positive birefringence A-Plate 36 and the uniaxial negative birefringence C-Plate 37 are as follows:

A value range of the in-plane retardation $R_o$ of the uniaxial positive birefringence A-Plate 36 at the wavelength of 550 nm is taken as 92 nm $\leq R_o \leq$ 184 nm. A value range of the retardation in the thickness direction $R_{th}$ of the uniaxial positive birefringence A-Plate 36 at the wavelength of 550 nm is taken as 46 nm $\leq R_{th} \leq$ 92 nm. A value range of the retardation in the thickness direction $R_{th}$ of the uniaxial negative birefringence C-Plate 37 is taken as $Y1 \leq R_{th} \leq Y2$. Wherein Y1 and Y2 satisfy the following equations (1) and (2):

$$Y1 = 0.0000826x^4 - 0.022868x^3 + 2.4074x^2 - 114.326x + 2251.5 \quad (1)$$

$$Y2 = -0.00006472x^4 + 0.017705x^3 - 1.8284x^2 + 84.4843x - 1181.17 \quad (2)$$

wherein X in the above equations (1) and (2) is a value of the retardation in the thickness direction $R_{th}$ of the uniaxial positive birefringence A-Plate 36.

The above-mentioned ranges of compensation values are shown in the following table:

| LCΔND | A-Plate Ro | A-Plate Rth | C-Plate Rth |
| --- | --- | --- | --- |
| [324.3 nm, 342.8 nm] | [92 nm, 184 nm] | [46 nm, 92 nm] | [Y1, Y2] |

Specifically, the ranges of the value of the in-plane retardation $R_o$ and the value of the retardation in the thickness direction $R_{th}$ of the uniaxial positive birefringence A-Plate 36 are adjusted and obtained from the following equations (3) and (4):

$$Ro = (Nx - Ny) * d1 \quad (3)$$

$$Rth = [(Nx + Ny)/2 - Nz] * d1 \quad (4)$$

Wherein $N_x$ is the maximum in-plane refractive index of the uniaxial positive birefringence A-Plate 36 which is a refractive index in the X direction. $N_y$ is the in-plane refractive index of the uniaxial positive birefringence A-Plate 36 orthogonal to the X direction that is a refractive index in the Y direction. $N_z$ is a refractive index in a thickness direction of the uniaxial positive birefringence A-Plate 36. d1 is a thickness of the uniaxial positive birefringence A-Plate 36, and $N_x > N_y$, $N_y = N_z$.

The range of the value of the retardation in the thickness direction $R_{th}$ of the uniaxial negative birefringence C-Plate 37 is adjusted and obtained from the following equation (5):

$$Rth = [(Mx + My)/2 - Mz] * d2 \quad (5)$$

Wherein $M_x$ is the maximum in-plane refractive index of the uniaxial negative birefringence C-Plate 37 which is a refractive index in the X direction. $M_y$ is the in-plane refractive index of the uniaxial negative birefringence C-Plate 37 orthogonal to the X direction that is a refractive index in the Y direction. $M_z$ is a refractive index in a thickness direction of the uniaxial negative birefringence C-Plate 37. d2 is a thickness of the uniaxial negative birefringence C-Plate 37, and $M_x = M_y$, $M_y > M_z$.

The following three embodiments A, B, and C are used to further elaborate on how the uniaxial positive birefringence A-Plate 36 and the uniaxial negative birefringence C-Plate 37 are adjusted based on the above equations (3), (4), and (5).

(A). When the values of the refractive indices $N_x$, $N_y$, and $N_z$ of the uniaxial positive birefringence A-Plate 36 are known, the thickness d1 of the uniaxial positive birefringence A-Plate 36 is adjusted. According to equations (3) and (4), the value range of the in-plane retardation $R_o$ of the uniaxial positive birefringence A-Plate 36 is adjusted to 92 nm ≤ $R_o$ ≤ 184 nm, and the value range of the retardation in the thickness direction $R_{th}$ of the uniaxial positive birefringence A-Plate 36 is adjusted to 46 nm ≤ $R_{th}$ ≤ 92 nm.

When the values of the refractive indices $M_x$, $M_y$, and $M_z$ of the uniaxial negative birefringence C-Plate 37 are known, the thickness d2 of the uniaxial negative birefringence C-Plate 37 is adjusted. According to equation (5), the value range of the retardation in the thickness direction $R_{th}$ of the uniaxial negative birefringence C-Plate 37 is adjusted to Y1 ≤ $R_{th}$ ≤ Y2.

(B). When the value of the thickness d1 of the uniaxial positive birefringence A-Plate 36 is known, the refractive indices $N_x$, $N_y$, and $N_z$ of the uniaxial positive birefringence A-Plate 36 are adjusted based on equations (3) and (4). The value range of the in-plane retardation $R_o$ of the uniaxial positive birefringence A-Plate 36 is adjusted to 92 nm ≤ $R_o$ ≤ 184 nm, and the value range of the retardation in the thickness direction $R_{th}$ of the uniaxial positive birefringence A-Plate 36 is adjusted to 46 nm ≤ $R_{th}$ ≤ 92 nm.

When the value of the thickness d2 of the uniaxial negative birefringence C-Plate 37 is known, the refractive indices $M_x$, $M_y$, and $M_z$ of the uniaxial negative birefringence C-Plate 37 are adjusted. Based on equation (5), the value range of the retardation in the thickness direction $R_{th}$ of the uniaxial negative birefringence C-Plate 37 is adjusted to Y1 ≤ $R_{th}$ ≤ Y2.

(C). First, both the refractive indices $N_x$, $N_y$, and $N_z$ and the thickness d1 of the uniaxial positive birefringence A-Plate 36 are adjusted. Based on equations (3) and (4), the value range of the in-plane retardation $R_o$ of the uniaxial positive birefringence A-Plate 36 is adjusted to 92 nm ≤ $R_o$ ≤ 184 nm, and the value range of the retardation in the thickness direction $R_{th}$ of the uniaxial positive birefingence A-Plate 36 is adjusted to 46 nm ≤ $R_{th}$ ≤ 92 nm. After that, both the refractive indices $M_x$, $M_y$, and $M_z$ and the thickness d2 of the uniaxial negative birefringence C-Plate 37 are adjusted. Based on equation (5), the value range of the retardation in the thickness direction $R_{th}$ of the uniaxial negative birefringence C-Plate 37 is adjusted to Y1 ≤ $R_{th}$ ≤ Y2.

The following three embodiments 1, 2, and 3 are used to elaborate on the technology effects of the present invention.

Figure 9:
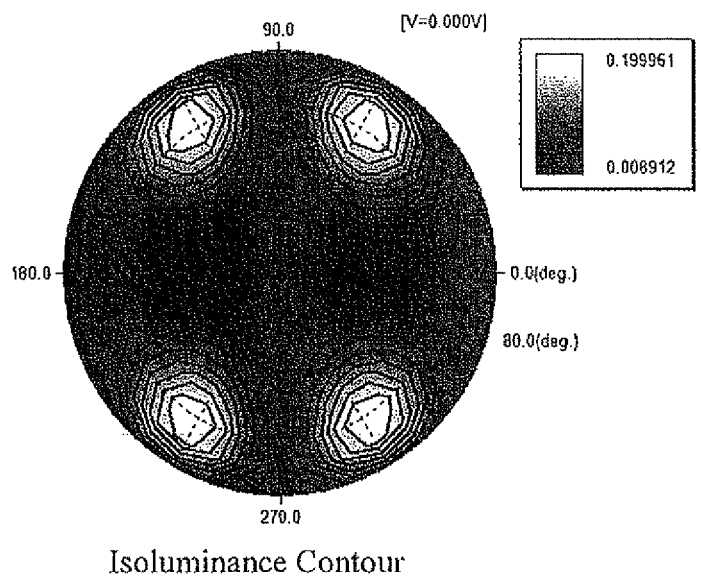
FIG. 9 is a schematic diagram of an isoluminance contour of dark-state light leakage after utilizing an A-Plate and a C-Plate having compensation values according to an embodiment of the present invention.
Figure 10:
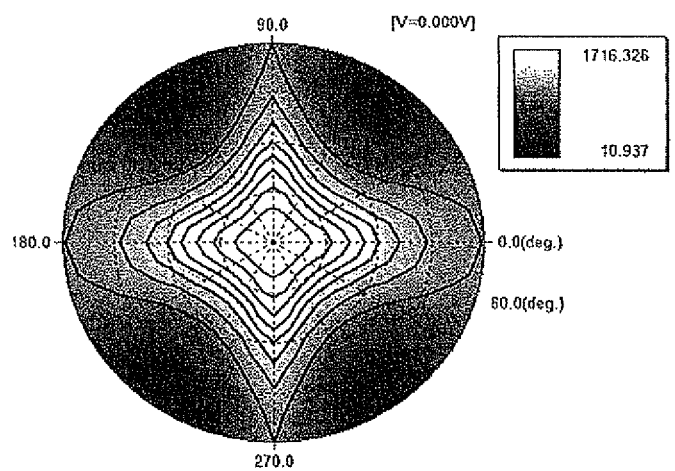
FIG. 10 is a schematic diagram of an equal contrast ratio contour at any viewing angle after utilizing the A-Plate and the C-Plate having the compensation values according to the embodiment of the present invention.

(1). To select the optical path difference of liquid crystal LCΔND=333.5 nm, the pretilt angle=89°, the in-plane retardation $R_o$ of the uniaxial positive birefringence A-Plate 36=144 nm, the retardation in the thickness direction $R_{th}$ of the uniaxial positive birefringence A-Plate 36=72 nm, the retardation in the thickness direction $R_{th}$ of the uniaxial negative birefringence C-Plate 37=195 nm. An isoluminance contour of dark-state light leakage corresponding to the above-mentioned compensation values is shown in FIG. 9. An equal contrast ratio contour at any viewing angle corresponding to the above-mentioned compensation values is shown in FIG. 10. The above-mentioned compensation values are shown in the following table:

| Optical path difference of liquid crystal | Pretilt angle of liquid crystal | A-plate Ro | A-plate Rth | C-plate Rth |
|---|---|---|---|---|
| 333.5 nm | 89° | 144 nm | 72 nm | 195 nm |

Figure 11:
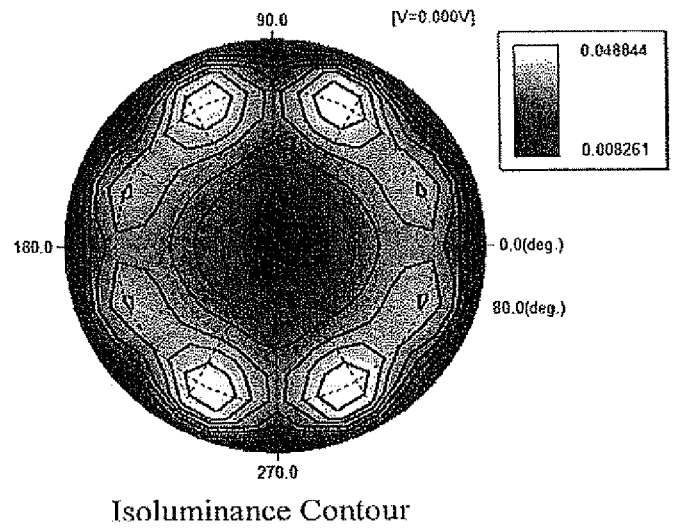
FIG. 11 is a schematic diagram of an isoluminance contour of dark-state light leakage after utilizing an A-Plate and a C-Plate having compensation values according to another embodiment of the present invention.
Figure 12:
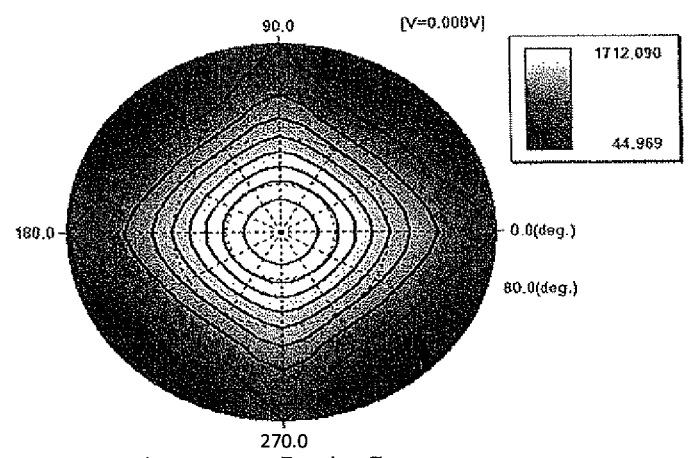
FIG. 12 is a schematic diagram of an equal contrast ratio contour at any viewing angle after utilizing the A-Plate and the C-Plate having the compensation values according to the another embodiment of the present invention.

(2). To select the optical path difference of liquid crystal LCΔND=333.5 nm, the pretilt angle=89°, the in-plane retardation $R_o$ of the uniaxial positive birefringence A-Plate 36=144 nm, the retardation in the thickness direction $R_{th}$ of the uniaxial positive birefringence A-Plate 36=72 nm, the retardation in the thickness direction $R_{th}$ of the uniaxial negative birefringence C-Plate 37=230 nm. An isoluminance contour of dark-state light leakage corresponding to the above-mentioned compensation values is shown in FIG. 11. An equal contrast ratio contour at any viewing angle corresponding to the above-mentioned compensation values is shown in FIG. 12. The above-mentioned compensation values are shown in the following table:

| Optical path difference of liquid crystal | Pretilt angle of liquid crystal | A-plate Ro | A-plate Rth | C-plate Rth |
|---|---|---|---|---|
| 333.5 nm | 89° | 144 nm | 72 nm | 230 nm |

Figure 13:
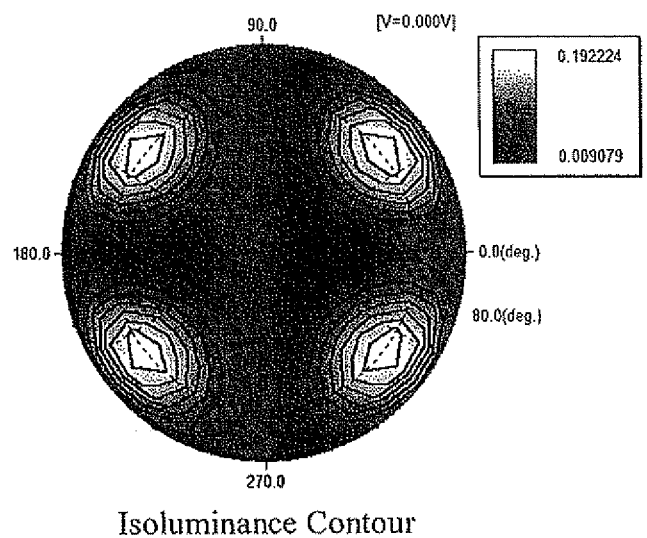
FIG. 13 is a schematic diagram of an isoluminance contour of dark-state light leakage after utilizing an A-Plate and a C-Plate having compensation values according to yet another embodiment of the present invention.
Figure 14:
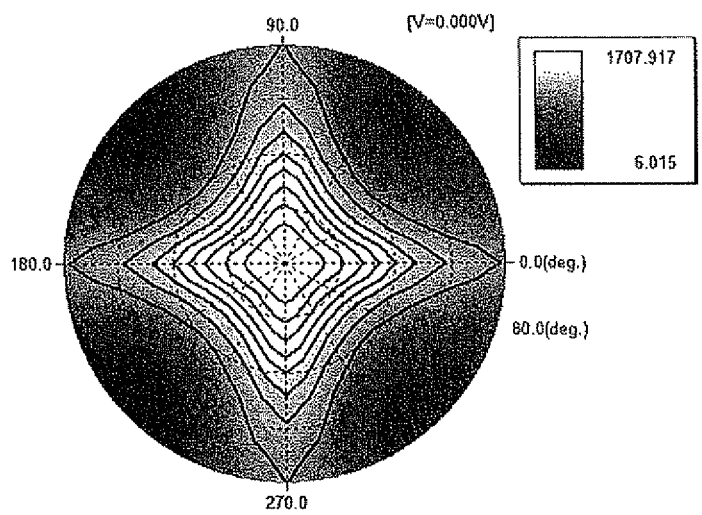
FIG. 14 is a schematic diagram of an equal contrast ratio contour at any viewing angle after utilizing the A-Plate and the C-Plate having the compensation values according to the yet another embodiment of the present invention.

(3). To select the optical path difference of liquid crystal LCΔND=333.5 nm, the pretilt angle=89°, the in-plane retardation $R_o$ of the uniaxial positive birefringence A-Plate 36=144 nm, the retardation in the thickness direction $R_{th}$ of the uniaxial positive birefringence A-Plate 36=72 nm, the retardation in the thickness direction $R_{th}$ of the uniaxial negative birefringence C-Plate 37=282 nm. An isoluminance contour of dark-state light leakage corresponding to the above-mentioned compensation values is shown in FIG. 13. An equal contrast ratio contour at any viewing angle corresponding to the above-mentioned compensation values is shown in FIG. 14. The above-mentioned compensation values are shown in the following table:

| Optical path difference of liquid crystal | Pretilt angle of liquid crystal | A-plate Ro | A-plate Rth | C-plate Rth |
|---|---|---|---|---|
| 333.5 nm | 89° | 144 nm | 72 nm | 282 nm |

Figure 1:
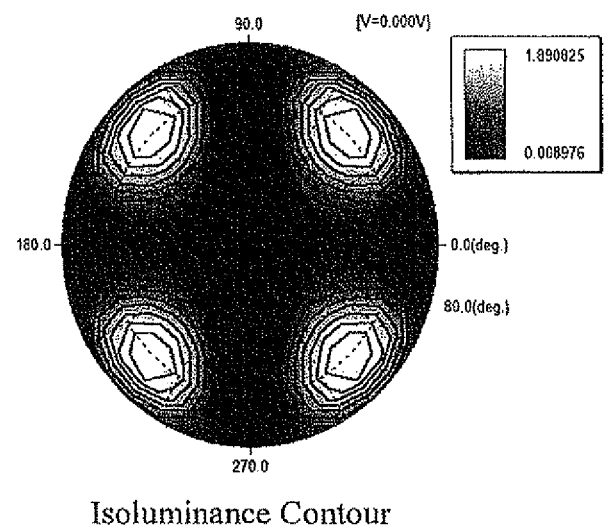
FIG. 1 is a schematic diagram of an isoluminance contour after dark-state light leakage is compensated by utilizing an A-Plate and a C-Plate according to the prior art.

The schematic diagrams of the isoluminance contours of dark-state light leakage after utilizing the A-Plate and the C-Plate having the compensation values according to the embodiments of the present invention, namely FIG. 9, FIG. 11, and FIG. 13, are compared with that after utilizing the A-Plate and the C-Plate according to the prior art, namely FIG. 1. The maximum dark-state light leakage after being compensated by the uniaxial positive birefringence A-Plate 36 and the uniaxial negative birefringence C-Plate 37 having the compensation values according to the embodiments of the present invention is reduced to within 0.2, much lower than 1.89 according to the prior art.

Figure 2:
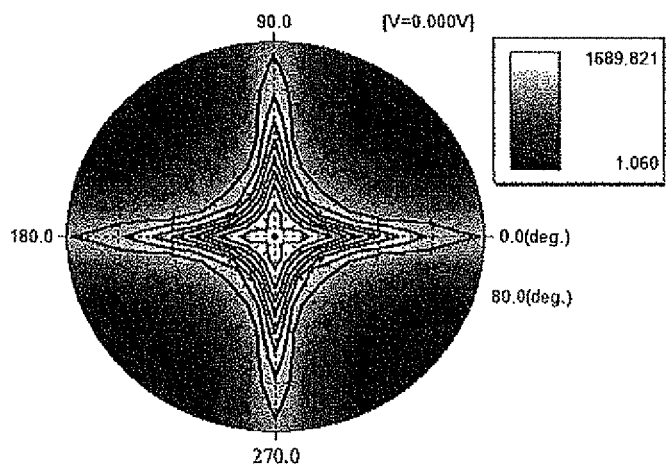
FIG. 2 is a schematic diagram of an equal contrast ratio contour at any viewing angle after being compensated by utilizing the A-Plate and the C-Plate according to the prior art.

The schematic diagrams of the equal contrast ratio contours at any viewing angle after utilizing the A-Plate and the C-Plate having the compensation values according to the embodiments of the present invention, namely FIG. 10, FIG. 12, and FIG. 14, are compared with that after utilizing the A-Plate and the C-Plate according to the prior art, namely FIG. 2. The contrast ratio contours at any viewing angle after being compensated by the uniaxial positive birefringence A-Plate 36 and the uniaxial negative birefringence C-Plate 37 having the compensation values according to the embodiments of the present invention is better that after being compensated according to the prior art. Hence, the present invention improves the severe dark-state light leakage phenomenon caused by adopting the A-plate and the C-plate having the compensation values according to the prior art. As a result, the contrast and clarity at a large viewing angle (not the azimuth angle from the horizontal or vertical direction) is effectively increased.

The present invention further provides a method of optical compensation for a liquid crystal display. The method is for the vertical alignment liquid crystal display, and in the visible wavelength range (380 nm, 760 nm), preferably 550 nm, a range of an optical path difference of liquid crystal LCΔND of the liquid crystal display at a wavelength of 550 nm is [324.3 nm, 324.8 nm]. A range of a pretilt angle of liquid crystal is [85°, 90°). The liquid crystal display comprises a uniaxial positive birefringence A-Plate 36 and a uniaxial negative birefringence C-Plate 37. The uniaxial positive birefringence A-Plate 36 and the uniaxial negative birefringence C-Plate 37 are disposed on opposite sides of the liquid crystal layer 33 and are disposed between the first substrate 31 and the first polarizer film 34 or between the second substrate 32 and the second polarizer film 35, for example, please refer to FIG. 3 and FIG. 4. The uniaxial positive birefringence A-Plate 36 and the uniaxial negative birefringence C-Plate 37 may be disposed on the same side of the liquid crystal layer 33 and are disposed between the first substrate 31 and the first polarizer film 34 or between the second substrate 32 and the second polarizer film 35, for example, please refer to FIG. 5 and FIG. 6.

The method of optical compensation for the liquid crystal display according to an embodiment of the present invention comprises:

(I). Adjust a value range of in-plane retardation $R_o$ of the uniaxial positive birefringence A-Plate 36 to 92 nm≤$R_o$≤184 nm.

(II). Adjust a value range of retardation in a thickness direction $R_{th}$ of the uniaxial positive birefringence A-Plate 36 to 46 nm≤$R_{th}$≤92 nm.

(III). Adjust a value range of retardation in a thickness direction $R_{th}$ of the uniaxial negative birefringence C-Plate 37 to Y1≤$R_{th}$≤Y2.

Wherein:

$$Y1=0.0000826x^4-0.022868x^3+2.4074x^2-114.326x+2251.5;$$

$$Y2=-0.00006472x^4+0.017705x^3-1.8284x^2+84.4843x-1181.17;$$

X is a value of the retardation in the thickness direction $R_{th}$ of the uniaxial positive birefringence A-Plate 36. It should be noted that the above-mentioned steps are in no particular order.

Specifically, the adjustment of the value range of the in-plane retardation $R_o$ of the uniaxial positive birefringence A-Plate 36 to 92 nm≤$R_o$≤184 nm and the adjustment of the value range of the retardation in the thickness direction $R_{th}$ of the uniaxial positive birefringence A-Plate 36 to 46 nm≤$R_{th}$≤92 nm are based on the following equations:

$$Ro=(Nx-Ny)*d1;$$

$$Rth=[(Nx+Ny)/2-Nz]*d1,$$

where $N_x$ is the maximum in-plane refractive index of the uniaxial positive birefringence A-Plate 36 which is a refractive index in the X direction. $N_y$ is the in-plane refractive index of the uniaxial positive birefringence A-Plate 36 orthogonal to the X direction that is a refractive index in the Y direction. $N_z$ is a refractive index in a thickness direction of the uniaxial positive birefringence A-Plate 36. d1 is a thickness of the uniaxial positive birefringence A-Plate 36, and $N_x>N_y$, $N_y=N_z$.

Specifically, the adjustment of the value range of the retardation in the thickness direction $R_{th}$ of the uniaxial negative birefringence C-Plate 37 to Y1≤$R_{th}$≤Y2 is based on the following equation:

$$Rth=[(Mx+My)/2-Mz]*d2,$$

where $M_x$ is the maximum in-plane refractive index of the uniaxial negative birefringence C-Plate 37 which is a refractive index in the X direction. $M_y$ is the in-plane refractive index of the uniaxial negative birefringence C-Plate 37 orthogonal to the X direction that is a refractive index in the Y direction. $M_z$ is a refractive index in a thickness direction of the uniaxial negative birefringence C-Plate 37. d2 is a thickness of the uniaxial negative birefringence C-Plate 37, and $M_x=M_y$, $M_y>M_z$.

For the specific adjustment process of the compensation values, please refer to the above detailed description of the liquid crystal display. Further description is not elaborated here.

The embodiments of the present invention are mainly for two types of optical compensation films: the uniaxial positive birefringence A-Plate and the uniaxial negative birefringence C-Plate that are utilized when the range of the optical path difference of liquid crystal LCΔND of the liquid crystal display at the wavelength of 550 nm is [324.3 nm, 324.8 nm] and the range of the pretilt angle of liquid crystal is [85°, 90°). By adjusting the compensation values of the above-mentioned two types of compensation films, the dark-state light leakage phenomenon at a large viewing angle is suppressed. The present invention is capable of increasing the contrast and clarity at a large viewing angle (not the azimuth angle from the horizontal or vertical direction) effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display, a range of an optical path difference of liquid crystal LCΔND of the liquid crystal display at a wavelength of 550 nm being 324.3 nm≤LCΔND≤342.8 nm, the liquid crystal display comprising:
   a first substrate;
   a second substrate;
   a liquid crystal layer disposed between the first substrate and the second substrate;
   a first polarizer film disposed on an outer side of the first substrate;
   a second polarizer film disposed on an outer side of the second substrate;
   a uniaxial positive birefringence A-Plate; and
   a uniaxial negative birefringence C-Plate, the uniaxial positive birefringence A-Plate and the uniaxial negative birefringence C-Plate being disposed between the first substrate and the first polarizer film or between the second substrate and the second polarizer film;
   wherein a value range of in-plane retardation $R_o$ of the uniaxial positive birefringence A-Plate is taken as 92 nm≤$R_o$≤184 nm, a value range of retardation in a thickness direction $R_{th}$ of the uniaxial positive birefringence A-Plate is taken as 46 nm≤$R_{th}$≤92 nm, a value range of retardation in a thickness direction $R_{th}$ of the uniaxial negative birefringence C-Plate is taken as Y1≤$R_{th}$≤Y2, and Y1 and Y2 satisfy the following equations:

$$Y1=0.0000826x^4-0.022868x^3+2.4074x^2-114.326x+2251.5;$$

$$Y2=-0.00006472x^4+0.017705x^3-1.8284x^2+84.4843x-1181.17;$$

X is a value of the retardation in the thickness direction $R_{th}$ of the uniaxial positive birefringence A-Plate.

2. The liquid crystal display as claimed in claim 1, wherein the ranges of the value of the in-plane retardation $R_o$ and the value of the retardation in the thickness direction $R_{th}$ of the uniaxial positive birefringence A-Plate are adjusted and obtained from the following equations:

$$Ro=(Nx-Ny)*d1;$$

$$Rth=[(Nx+Ny)/2-Nz]*d1;$$

wherein $N_x$ is the maximum in-plane refractive index of the uniaxial positive birefringence A-Plate which is a refractive index in the X direction, $N_y$ is the in-plane refractive index of the uniaxial positive birefringence A-Plate orthogonal to the X direction that is a refractive index in the Y direction, $N_z$ is a refractive index in a thickness direction of the uniaxial positive birefringence A-Plate, d1 is a thickness of the uniaxial positive birefringence A-Plate, and $N_x>N_y$, $N_y=N_z$.

3. The liquid crystal display as claimed in claim 1, wherein the range of the value of the retardation in the thickness direction $R_{th}$ of the uniaxial negative birefringence C-Plate is adjusted and obtained from the following equation:

$$Rth=[(Mx+My)/2-Mz]*d2;$$

wherein $M_x$ is the maximum in-plane refractive index of the uniaxial negative birefringence C-Plate which is a refractive index in the X direction, $M_y$ is the in-plane refractive index of the uniaxial negative birefringence C-Plate orthogonal to the X direction that is a refractive index in the Y direction, $M_z$ is a refractive index in a thickness direction of the uniaxial negative birefringence C-Plate, d2 is a thickness of the uniaxial negative birefringence C-Plate, and $M_x=M_y$, $M_y>M_z$.

4. The liquid crystal display as claimed in claim 1, wherein the uniaxial positive birefringence A-Plate and the uniaxial negative birefringence C-Plate are disposed on two opposite sides of the liquid crystal layer, and are disposed between the first substrate and the first polarizer film or between the second substrate and the second polarizer film.

5. The liquid crystal display as claimed in claim 1, wherein the uniaxial positive birefringence A-Plate and the uniaxial negative birefringence C-Plate are disposed on the same side of the liquid crystal layer, and are disposed between the first substrate and the first polarizer film or between the second substrate and the second polarizer film.

6. A liquid crystal display, comprising:
   a first substrate;
   a second substrate;
   a liquid crystal layer disposed between the first substrate and the second substrate;
   a first polarizer film disposed on an outer side of the first substrate;
   a second polarizer film disposed on an outer side of the second substrate;
   a uniaxial positive birefringence A-Plate; and
   a uniaxial negative birefringence C-Plate, the uniaxial positive birefringence A-Plate and the uniaxial negative birefringence C-Plate being disposed between the first substrate and the first polarizer film or between the second substrate and the second polarizer film;
   wherein a value range of in-plane retardation $R_o$ of the uniaxial positive birefringence A-Plate is taken as 92 nm≤$R_o$≤184 nm, a value range of retardation in a thickness direction $R_{th}$ of the uniaxial positive birefringence A-Plate is taken as 46 nm≤$R_{th}$≤92 nm, a value range of retardation in a thickness direction $R_{th}$ of the uniaxial negative birefringence C-Plate is taken as Y1≤$R_{th}$≤Y2, and Y1 and Y2 satisfy the following equations:

$$Y1=0.0000826x^4-0.022868x^3+2.4074x^2-114.326x+2251.5;$$

$$Y2=-0.00006472x^4+0.017705x^3-1.8284x^2+84.4843x-1181.17;$$

X is a value of the retardation in the thickness direction $R_{th}$ of the uniaxial positive birefringence A-Plate.

7. The liquid crystal display as claimed in claim 6, wherein the ranges of the value of the in-plane retardation $R_o$ and the value of the retardation in the thickness direction $R_{th}$ of the uniaxial positive birefringence A-Plate are adjusted and obtained from the following equations:

$$Ro=(Nx-Ny)*d1;$$

$$Rth=[(Nx+Ny)/2-Nz]*d1;$$

wherein $N_x$ is the maximum in-plane refractive index of the uniaxial positive birefringence A-Plate which is a refractive index in the X direction, $N_y$ is the in-plane refractive index of the uniaxial positive birefringence A-Plate orthogonal to the X direction that is a refractive index in the Y direction, $N_z$ is a refractive index in a thickness direction of the uniaxial positive birefringence A-Plate, d1 is a thickness of the uniaxial positive birefringence A-Plate, and $N_x>N_y$, $N_y=N_z$.

8. The liquid crystal display as claimed in claim 6, wherein the range of the value of the retardation in the thickness direction $R_{th}$ of the uniaxial negative birefringence C-Plate is adjusted and obtained from the following equation:

$$Rth=[(Mx+My)/2-Mz]*d2;$$

wherein $M_x$ is the maximum in-plane refractive index of the uniaxial negative birefringence C-Plate which is a refractive index in the X direction, $M_y$ is the in-plane refractive index of the uniaxial negative birefringence C-Plate orthogonal to the X direction that is a refractive index in the Y direction, $M_z$ is a refractive index in a thickness direction of the uniaxial negative birefringence C-Plate, d2 is a thickness of the uniaxial negative birefringence C-Plate, and $M_x=M_y$, $M_y>M_z$.

9. The liquid crystal display as claimed in claim 6, wherein the uniaxial positive birefringence A-Plate and the uniaxial negative birefringence C-Plate are disposed on two opposite sides of the liquid crystal layer, and are disposed between the first substrate and the first polarizer film or between the second substrate and the second polarizer film.

10. The liquid crystal display as claimed in claim 6, wherein the uniaxial positive birefringence A-Plate and the uniaxial negative birefringence C-Plate are disposed on the same side of the liquid crystal layer, and are disposed between the first substrate and the first polarizer film or between the second substrate and the second polarizer film.

11. A method of optical compensation for a liquid crystal display, comprising:
adjusting a value range of in-plane retardation $R_o$ of a uniaxial positive birefringence A-Plate to 92 nm≤$R_o$≤184 nm;
adjusting a value range of retardation in a thickness direction $R_{th}$ of the uniaxial positive birefringence A-Plate to 46 nm≤$R_{th}$≤92 nm; and
adjust a value range of retardation in a thickness direction $R_{th}$ of a uniaxial negative birefringence C-Plate to Y1≤$R_{th}$≤Y2;
wherein Y1 and Y2 satisfy the following equations:

$$Y1=0.0000826x^4-0.022868x^3+2.4074x^2-114.326x+2251.5;$$

$$Y2=-0.00006472x^4+0.017705x^3-1.8284x^2+84.4843x-1181.17;$$

X is a value of the retardation in the thickness direction $R_{th}$ of the uniaxial positive birefringence A-Plate, the uniaxial positive birefringence A-Plate and the uniaxial negative birefringence C-Plate are disposed between a first substrate and a first polarizer film of the liquid crystal display or between a second substrate and a second polarizer film of the liquid crystal display.

12. The method of optical compensation as claimed in claim 11, wherein the adjustment of the value range of the in-plane retardation $R_o$ of the uniaxial positive birefringence A-Plate to 92 nm≤$R_o$≤184 nm and the adjustment of the value range of the retardation in the thickness direction $R_{th}$ of the uniaxial positive birefringence A-Plate to 46 nm≤$R_{th}$≤92 nm are based on the following equations:

$$Ro=(Nx-Ny)*d1;$$

$$Rth=[(Nx+Ny)/2-Nz]*d1;$$

wherein $N_x$ is the maximum in-plane refractive index of the uniaxial positive birefringence A-Plate which is a refractive index in the X direction, $N_y$ is the in-plane refractive index of the uniaxial positive birefringence A-Plate orthogonal to the X direction that is a refractive index in the Y direction, $N_z$ is a refractive index in a thickness direction of the uniaxial positive birefringence A-Plate, d1 is a thickness of the uniaxial positive birefringence A-Plate, and $N_x>N_y$, $N_y=N_z$.

13. The method of optical compensation as claimed in claim 11, wherein the adjustment of the value range of the retardation in the thickness direction $R_{th}$ of the uniaxial negative birefringence C-Plate to Y1≤$R_{th}$≤Y2 is based on the following equation:

$$Rth=[(Mx+My)/2-Mz]*d2;$$

wherein $M_x$ is the maximum in-plane refractive index of the uniaxial negative birefringence C-Plate which is a refractive index in the X direction, $M_y$ is the in-plane refractive index of the uniaxial negative birefringence C-Plate orthogonal to the X direction that is a refractive index in the Y direction, $M_z$ is a refractive index in a thickness direction of the uniaxial negative birefringence C-Plate, d2 is a thickness of the uniaxial negative birefringence C-Plate, and $M_x=M_y$, $M_y>M_z$.

14. The method of optical compensation as claimed in claim 11, wherein the uniaxial positive birefringence A-Plate and the uniaxial negative birefringence C-Plate are disposed on two opposite sides of a liquid crystal layer, and are disposed between the first substrate and the first polarizer film or between the second substrate and the second polarizer film.

15. The method of optical compensation as claimed in claim 11, wherein the uniaxial positive birefringence A-Plate and the uniaxial negative birefringence C-Plate are disposed on the same side of a liquid crystal layer, and are disposed between the first substrate and the first polarizer film or between the second substrate and the second polarizer film.

* * * * *